United States Patent [19]

Decker

[11] Patent Number: 5,449,391
[45] Date of Patent: Sep. 12, 1995

[54] AIR PRECLEANER

[75] Inventor: William K. Decker, Cambridge, Wis.

[73] Assignee: American Farm Implement & Specialty, Inc., Janesville, Wis.

[21] Appl. No.: 215,222

[22] Filed: Mar. 21, 1994

[51] Int. Cl.⁶ ............................................. B01D 45/00
[52] U.S. Cl. ..................................... 55/404; 55/430; 55/456; 55/449
[58] Field of Search .................... 55/385.3, 404, 430, 55/449, 456

[56] References Cited

U.S. PATENT DOCUMENTS

| | | |
|---|---|---|
| 149,742 | 4/1874 | Gordon ............................... 55/404 |
| 2,193,479 | 3/1940 | Donaldson . |
| 2,304,778 | 12/1942 | Cresswell . |
| 2,417,130 | 3/1947 | Russell . |
| 2,973,830 | 3/1961 | Gruener . |
| 3,552,102 | 1/1971 | Araki . |
| 3,670,480 | 6/1972 | Petersen . |
| 3,740,932 | 6/1973 | Borsheim . |
| 3,791,112 | 2/1974 | Lidstone . |
| 3,973,937 | 8/1976 | Petersen . |
| 4,013,137 | 3/1977 | Petersen . |
| 4,135,897 | 1/1979 | Gondek . |
| 4,138,761 | 2/1979 | Nauta . |
| 4,197,102 | 4/1980 | Decker . |
| 4,201,557 | 5/1980 | Petersen . |
| 4,248,613 | 2/1981 | Linhart . |
| 4,373,940 | 2/1983 | Petersen . |
| 4,459,141 | 7/1984 | Burrington et al. . |
| 4,547,207 | 10/1985 | Petersen . |
| 5,022,903 | 6/1991 | Decker . |

FOREIGN PATENT DOCUMENTS

| | | |
|---|---|---|
| 683986 | 6/1930 | France . |
| 483058 | 7/1953 | Italy . |

OTHER PUBLICATIONS

Advertisements for Best-Ex Centri Air Pre-Cleaners, by Best-Ex, Inc. before 1990.
Photographs of Centri Air Pre-Cleaner sold by Best-Ex, Inc. in the United States.
Photocopy of cutaway view of the Centri Air Pre-Cleaner sold by Best-Ex, Inc.
Advertisement, Price List, and Specifications for Turbo Pre-Cleaner by Sureco, Mar. 1, 1987.

Primary Examiner—C. Scott Bushey
Attorney, Agent, or Firm—Foley & Lardner

[57] ABSTRACT

A high efficiency air precleaner has a base assembly, a hood, and a rotor assembly. The base assembly includes an inner circumferential wall and an outer circumferential wall, the inner circumferential wall defining an air outlet port. Angled web supports connect the outer circumferential wall to the inner circumferential wall and their arrangement forms air inlet ports that direct air upon the rotor assembly. The rotor assembly includes a rotatable hub that has arms extending outward therefrom, each of the arms including a radial first blade, an axial second blade descending at a right angle from the first blade, a paddle at the outer end of each arm, and a tab extending downwardly from the second blade adjacent the hub. The first blade extends from the edge of the second blade forwardly in a direction corresponding to the direction of rotation of the hub. Air incident upon the arms causes rotation of the hub, the arms flinging particulates outward. Air flowing over the back side of the second blade is unobstructed to enhance the efficiency of the precleaner. Particulates flung outward by the arms are discharged through the gap.

10 Claims, 3 Drawing Sheets

AIR PRECLEANER

FIELD OF THE INVENTION

This invention relates generally to devices for separating particulates from the air such as dirt, dust, rain, and snow before they enter the air stream of an engine, air compressor, or similar apparatus.

BACKGROUND OF THE INVENTION

Air precleaners are devices typically used in the removal of dust, dirt, sand, rain, snow and other air-borne particulates from the air prior to the flow of air to the carburetor of an internal combustion engine. Such precleaners promote more efficient combustion and longer engine and filter life. The efficiency of the precleaner is determined by the percentage of particulates that are removed from the intake air by the precleaner. The more efficient the precleaner, the lesser the amount of particulates that must be removed by the air filter.

The precleaners of the prior art have various configurations that are employed as a means of removing the particulates from the air. Examples of precleaners or particle separators are shown in U.S. Pat. Nos. 2,193,479; 2,304,778; 2,417,130; 2,973,830; 3,552,102; 3,670,480; 3,740,932; 3,971,112; 3,973,937; 4,138,761; 4,197,102; 4,547,207; and 5,022,903.

Although such precleaners may adequately perform with respect to particulate removal, this is sometimes accomplished at the expense of a reduced air flow, i.e. the precleaner itself may become an air restriction. Some precleaners are also usable when positioned in only one orientation.

SUMMARY OF THE INVENTION

In accordance with the present invention, an air precleaner includes a base assembly, a dome-shaped hood, and a rotor assembly. The base assembly has an inner circumferential wall and an outer circumferential wall, the inner circumferential wall defining an air outlet port. Angled web supports connect the outer circumferential wall to the inner circumferential wall and their arrangement forms air inlet ports that direct air upon the rotor assembly. An even gap is formed substantially about a 360° interface between the base assembly and the hood, with the gap serving as the discharge port for particulate matter. The rotor assembly includes a hub having a plurality of arms extending therefrom that rotates upon an axle when struck by air entering through the air inlet ports. Each arm includes two blades oriented perpendicularly to one another: a first blade in a plane radial to the hub, i.e., a plane perpendicular to the axis of rotation, and a second blade in a plane axial to the hub, i.e., a plane parallel to and preferably coincident with the axis of rotation. The first blade extends perpendicularly from the front side of the second blade in a direction corresponding to the direction of rotation of the rotor assembly; for example, if the rotor assembly is to rotate in a counterclockwise direction, the first blade will extend from the second blade in a counterclockwise direction. The back side of the second blade does not have a blade or airfoil extending from it, so that air flowing past the back side of the second blade is substantially unobstructed. This blade orientation, with the radial blade leading the axial blade, has been found to result in a surprisingly greater removal of particulate matter from the air entering the outlet port at all ranges of air flow than that achieved by prior air precleaners wherein the first blade extends from the second blade in a direction opposite that of rotor rotation, or wherein the first blade extends from the second blade in both directions.

In the operation of the air precleaner of the present invention, air to be cleaned is drawn through the air inlet ports and directed toward the rotor assembly. Air incident upon the arms of the rotor assembly causes rotation of the rotor assembly, so that particulate matter is flung toward the hood. The arms of the rotor preferably each have a large surface area paddle integrally formed at the outermost end of each arm to increase the moment of inertia of the rotor and provide enhanced particulate sweeping action at the radial periphery of the rotor. The paddles preferably lie in an axial plane. The rotor also includes a tab on each arm which extends downwardly from the second blade at a position adjacent the hub. The tabs, which can generally lie in or be bent backwardly from an axial plane, can be sized to provide control of the typical rotational speed of the rotor. These tabs extend down into the throat of the air outlet port. The particulates are driven by the rotor out to the hood and then down the surface of the hood to be discharged through the gap. Cleaned air is drawn through the air outlet port by, for example, the vacuum draw of an engine.

The precleaner of the present invention provides restriction of the air entering and exiting the precleaner which is generally as low as or less than existing precleaners, thus allowing complete and efficient combustion of the fuel. Nonetheless, the precleaner concurrently provides more efficient removal of particulates than existing precleaners.

Further objects, features, and advantages of the invention will be apparent from the following detailed description taken in conjunction with the accompanying drawings.

DESCRIPTION OF THE PREFERRED EMBODIMENT

Figure 1:
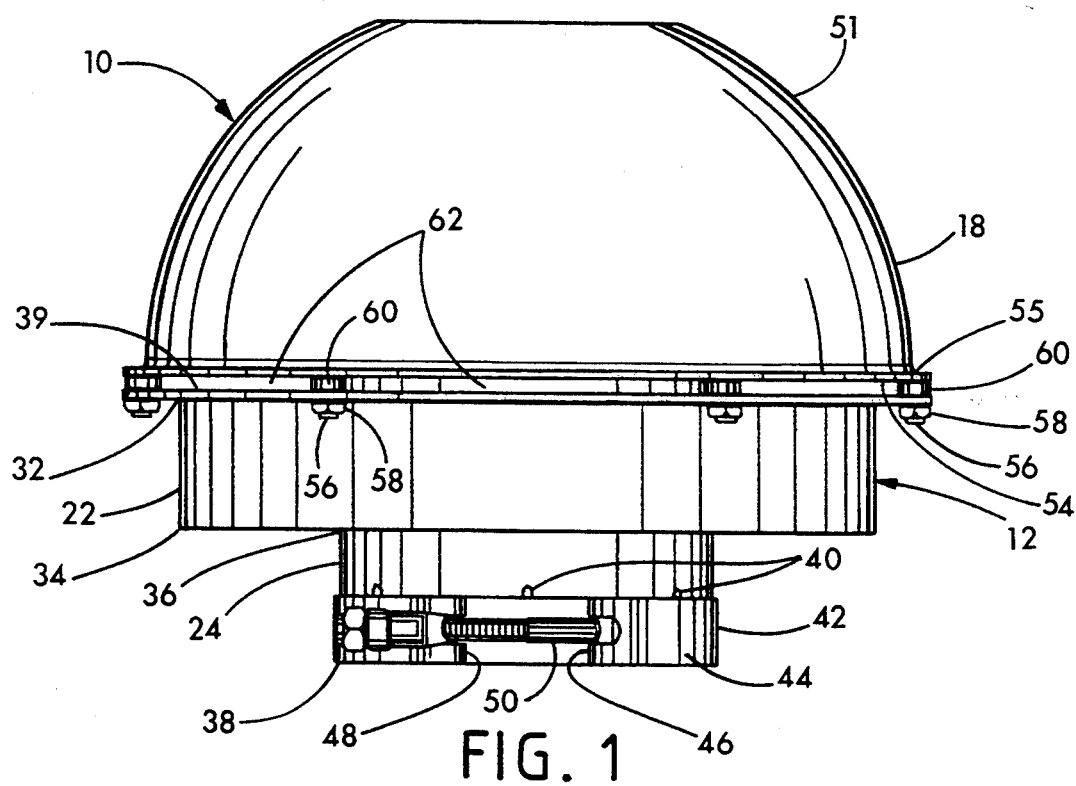
FIG. 1 is a side view of the air precleaner of the present invention.
Figure 2:
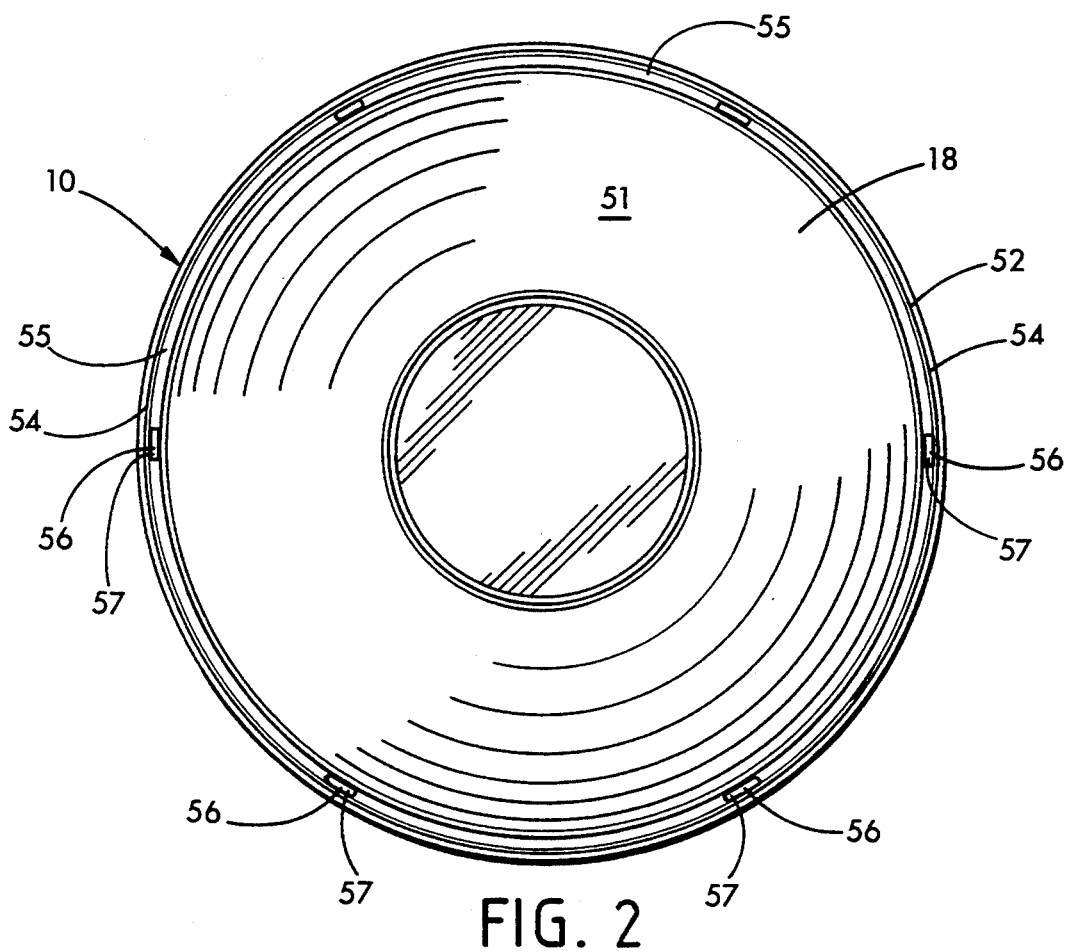
FIG. 2 is a top view of the air precleaner of the present invention.

With reference to the drawings, FIGS. 1–4 show various views of the air precleaner of the present invention at 10. The air precleaner 10 comprises a base assembly 12 having air inlet ports 14 and an air outlet port 16, a dome-shaped hood 18 positioned above the base assembly 12, and a rotor assembly 20 that is rotatably mounted on the interior of the precleaner 10. The precleaner 10 is a device used for separating particulates from a carrier fluid. Where the carrier fluid is air, exemplary particulates include dust, dirt, sand, rain, snow, or any other air-borne particle matter.

Figure 3:
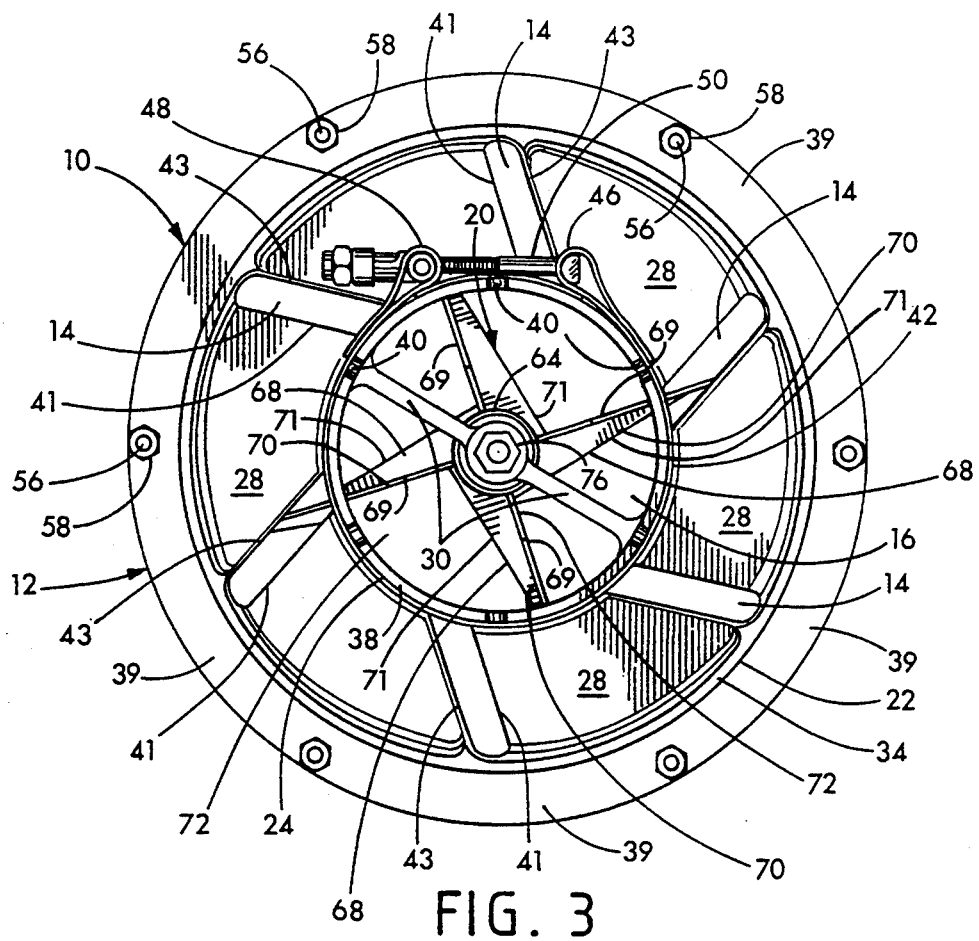
FIG. 3 is a bottom view of the air precleaner of the present invention.

The base assembly 12 is cast or formed in a single piece to include an outer circumferential wall 22, an inner circumferential wall 24, a plurality of web segments 28, and a strut 30. In the orientation shown in the figures, the outer circumferential wall 22 has a top 32 and a bottom 34 and the inner circumferential wall 24 has a top 36 and a bottom 38. A peripheral ledge 39 extends from the top 32 of the outer circumferential wall 22. The web segments 28 connect the outer circumferential wall 22 to the inner circumferential wall 24 and, by their arrangement between the outer and inner circumferential walls 22 and 24, form the air inlet ports 14 that allow fluid communication from the exterior of the precleaner 10 to the interior of the precleaner 10. In the orientation shown in FIG. 4, each of the web supports 28 is angled from a low first edge 41 to a high second edge 43, the second edge 43 being located counterclockwise from the first edge 41. The web supports 28 are thus successively arranged in counterclockwise fashion in the area formed between the outer circumferential wall 22 and the inner circumferential wall 24. Each of the air inlet ports 14 are formed and bounded by the second edge 43 of one web support 28 and the first edge 41 of the succeeding counterclockwise web support 28. The air inlet ports 14 are also bounded by the outer circumferential wall 22 and the inner circumferential wall 24. There are six air inlet ports 14 in the precleaner 10 as depicted in FIG. 3, although other numbers are possible. The ports 14 are angled so that fluid is drawn in from the exterior of the precleaner 10 and directed at the rotor assembly 20, in a manner described below.

The inner circumferential wall 24 defines the air outlet port 16, the bottom 38 of the inner circumferential wall 24 extending below the bottom 34 of the outer circumferential wall 22. The outlet port 16, as defined by the inner circumferential wall 24, is typically serially connected and fitted to the air intake of an engine, air compressor, or similar apparatus, so that the precleaner 10 acts to preclean the air prior to its entry into the apparatus. The operation of the precleaner 10 will be described in further detail below. The inner circumferential wall 24 has longitudinal slots 40 that extend upward from the bottom 38 of the inner circumferential wall 24 so that the inner circumferential wall 24 may be more easily fitted over the top of the air intake of the engine, air compressor, or similar apparatus. A clamp 42 having a band 44 terminating in a first end 46 and a second end 48, and further including a screw 50 threaded through the first and second ends 46 and 48, is positioned so that the band 44 wraps circumferentially about the inner circumferential wall 24 in the region of the longitudinal slots 40 so that when the screw 50 is tightened to draw the first and second ends 46 and 48 together, the inner circumferential wall 24 is tightly secured about the air intake of the engine, air compressor, or similar apparatus. The outlet port 16 of the precleaner 10 is therefore in fluid communication with the air intake of the engine, air compressor, or similar apparatus. The strut 30 extends diametrically across the outlet port 16 upon which the rotor assembly 20 is mounted.

The hood 18 has a dome-shaped surface 51, terminating at a peripheral edge 52. "Dome-shaped," as used herein, is defined to mean a shape that is hemispherical, convex, shaped like an inverted bowl, or to have portions that are represented by sections that are substantially hemispherical, convex, or shaped like an inverted bowl. The outer walls of the dome-shaped hood 18 may also be cylindrical rather than continuously curved. The hood 18 defines an air space above the base assembly 12 so that the air space and the inlet and outlet ports 14 and 16 are in fluid communication. The peripheral edge 52 is rolled to form a lip 54 and a circumferential channel 55 between the lip 54 and the dome-shaped surface 51. The hood 18 is attached to the base assembly 12 by bolts 56 that extend through the peripheral edge 52 and the ledge 39 of the base assembly 12, the bolts 56 each having heads 57 at one end that fit within the channel 55 to prevent rotation of the bolts 56. The bolts 56 are secured by nuts 58 at the end of the bolts 56 opposite the heads 57. Spacers 60 are positioned about the bolts 56 between the ledge 39 of the base assembly 12 and the peripheral edge 52 of the hood 18. Each of the spacers 60 are of equal thickness so as to create an even gap 62 between the base assembly 12 and the hood 18 and are preferably integrally molded with the base 12. The gap 62 therefore extends substantially about the 360° interface between the base assembly 12 and the hood 18, except in the small amount of area occupied by the spacers 60. As explained in greater detail below, the gap 62 serves as a discharge port for the particulates that are removed from the carrier fluid.

Figure 5:
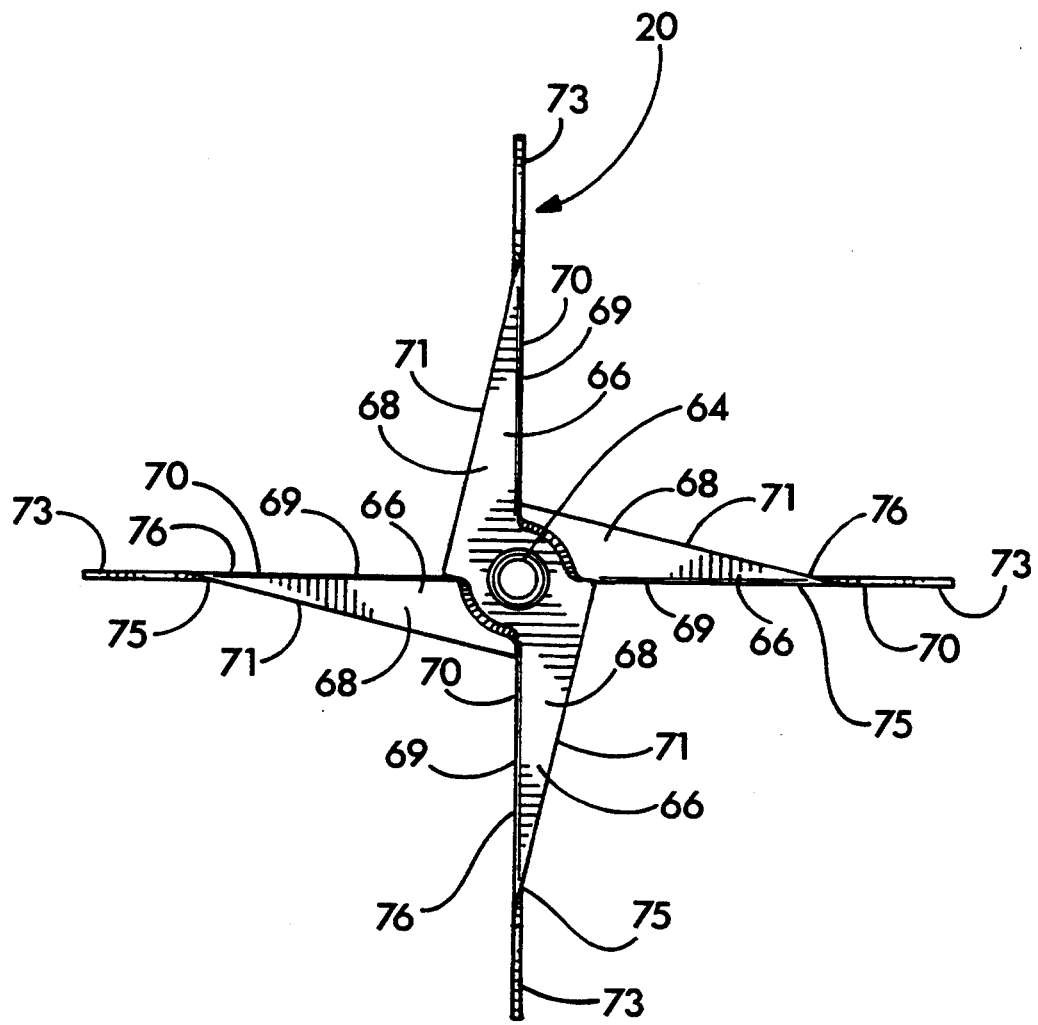
FIG. 5 is a top view of the rotor assembly of the air precleaner of the invention.
Figure 6:
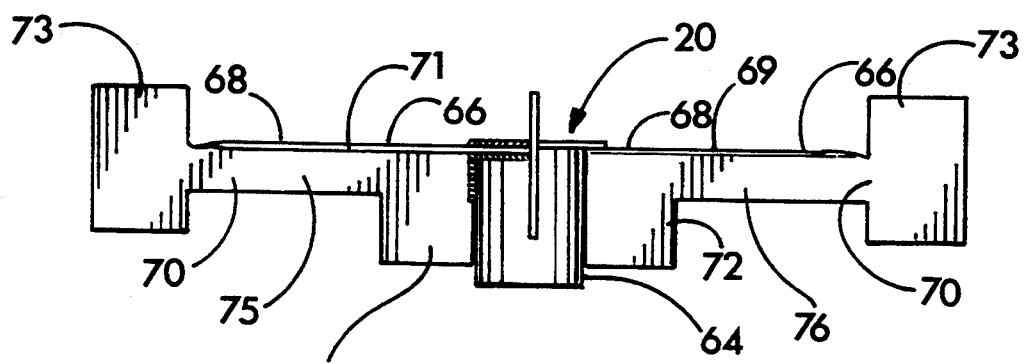
FIG. 6 is a side view of the rotor assembly of FIG. 5.

The rotor assembly 20 is best shown in FIGS. 5 and 6. The rotor assembly 20 comprises a machined hub 64 with four arms 66 extending radially therefrom, the arms 66 being equidistant from each other to form an "X"-type configuration. It is also possible that more or less than four arms 66 could be used. Each of the arms 66 has a first blade 68 and a second blade 70. The first blades 68 are in a plane radial to the hub 64, that is, a plane perpendicular to the axis of rotation of the rotor; the second blades 70 are preferably in planes axial to the hub 64, that is, planes parallel to and preferably coincident with the axis of rotation. The first blade 68 has a leading edge 71 and a trailing edge 69, wherein the leading edge 71 precedes the trailing edge 69 as each arm 66 moves along its circular path of rotation. The first blade 68 is preferably wedge shaped, as shown in FIG. 5, being widest at the position at which it joins the hub 64 and tapering to a terminus of the leading edge 71 at a position adjacent to paddles 73 formed at the outer ends of the arms. The second blade 70 descends preferably perpendicularly from the trailing edge 69 of the first blade 68 and has a front side 75 and a back side 76. In a base assembly 12 that is designed to create a counterclockwise rotor assembly 20 rotation (as in the base assembly shown in FIG. 3), the first blade 68 protrudes from the front side 75 of the second blade 70 in a counterclockwise direction, whereas the back side 76 of the second blade 70 is free of obstruction, and thus air flowing past the back side 76 is substantially unobstructed. This structure of the first or radial blade 68 has been found to surprisingly increase the removal of particulate matter, at all ranges of air flow, over that obtained by either a rotor assembly 20 using a radial blade that protrudes from the axial blade in a direction opposite to that of rotor rotation, or a radial blade that extends both fore and aft (i.e., in a clockwise and counterclockwise direction) from the axial blade. Generally, an increase of particulate removal efficiency of 2 to 5 percent over conventional precleaners is obtained, yielding efficiencies typically 90% or higher.

Figure 4:
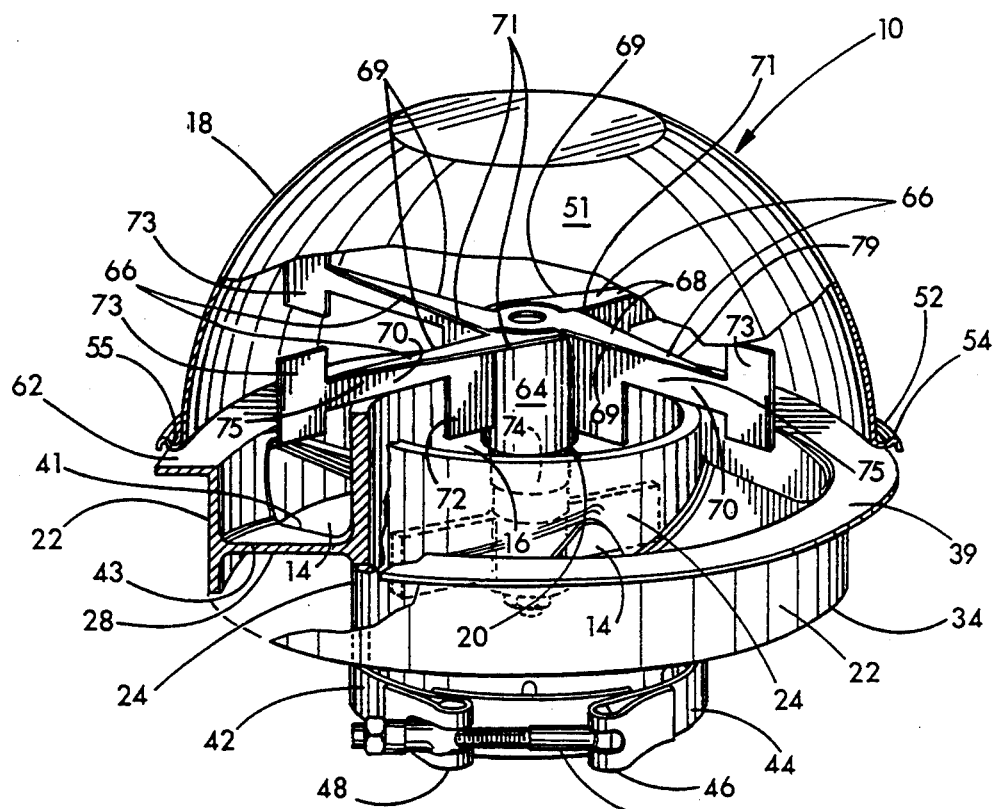
FIG. 4 is a perspective view of the air precleaner of the present invention with portions of the hood and base assembly of the precleaner being cut away to show internal parts of the precleaner.

Each of the arms 66 also preferably has an integrally formed tab 72 that extends downwardly from the axial blade 70 in a manner as depicted in FIG. 4 and extends into the throat of the air outlet port. The tabs 72 are located proximate to the hub 64 and as shown lie in an axial plane. They may also be slightly bent or flared in a clockwise direction, as illustrated in U.S. Pat. No. 5,022,903, incorporated herein by reference. A bent tab can be advantageous at high altitudes, where the angle of the tabs 72 may be increased to compensate for the lower intake air pressure and thereby maintain the rotational speed of the rotor assembly 20 at a desired high rate despite the low air density. It may be desirable, and is considered within the scope of the present invention, for the length of the tabs 72 to be selected for different applications. The size of the tabs 72 is related to the speed of the rotor assembly 20, which correspondingly affects the efficiency of the precleaner 10 for different altitudes of operation. In higher altitude applications, for example, longer tabs 72 are preferable.

Each of the arms 66 further includes a paddle 73 extending from the outer end of the second blade 70. The paddle 73 provides increased surface area to meet the air drawn in from the air inlet ports 14, and thereby better utilizes the force of the inlet air flow and can help increase the rotational speed of the rotor assembly 20 and impel particulates toward the inner wall of the hood. The paddles 73 also add mass to each of the arms 66 and thereby increase the moment of inertia of the rotor assembly, helping to maintain a uniform rotational speed of the rotor assembly 20. An increased moment of inertia could also be obtained by replacing the paddles 73 with weights located on the ends of each rotor arm 66. However, the planar paddles 73 are preferred. While the paddle 73 may be placed anywhere along the second blade 70, greater rotational speed and a greater moment of inertia are obtained when the paddle 73 is located further from the hub 64. The paddles preferably have substantially larger axial dimension or "height" than the second blades 70, extending above and below the second blades as shown in FIGS. 4 and 6.

The hub 64 is preferably mounted upon a precision ground axle 74 by two highly ground precision shielded bearings (not shown). The axle 74 is threaded at one end and is attached to the strut 30 that extends diametrically across the outlet port 16 by a nut 76.

In the operation of the precleaner 10, air that may contain particulate matter is typically drawn into the precleaner 10 by vacuum pressure caused by an engine or similar device mounted below the air outlet port 16 of the precleaner 10. The air is thus drawn through the air inlet ports 14, the angling of the web supports 28 directing the air flow in a circular, counterclockwise direction within the precleaner 10. The air flow is directed against the blades 68 and 70, and the tabs 72, of the rotor assembly 20, thus causing the rotor assembly 20 to spin in a counterclockwise direction. Of course, the direction of the web supports 28 could be reversed, and the orientation of the parts of the rotor assembly 20 reversed, to provide rotation in the clockwise direction. The circular motion of the rotor assembly 20 impels the intake air in circular motion, causing a centrifugal force to be exerted on particulates within the air that has been drawn into the precleaner 10. The particulates are thus flung outward, either through the gap 62 or against the hood 18. The configuration of the hood 18 forces particulates down the interior of the surface 51 for discharge through the gap 62. Cleaned air is then drawn by the vacuum effect of the engine through the air outlet port 16 into the intake of an engine or similar apparatus.

The above-described precleaner of the present invention is an effective means of precleaning air that is to be introduced into an engine, air compressor, or similar apparatus, and is efficient even at high altitudes. It is to be understood that the precleaner 10 of the present invention is not limited merely to applications within air and to those applications that remove particulates that are typically contained within air. The precleaner 10 will work in applications involving other fluids as well. Though the figures and the corresponding text have, for example, assigned a "top" a "bottom," and corresponding identifying labels to the precleaner 10, these have been used for illustrative purposes inasmuch as the air precleaner 10 can be mounted and will function in any position. Further, though the air inlet ports 14 and the rotor assembly 20 have been depicted to cause air flow and rotation of the rotor assembly 20 in a counterclockwise direction, a precleaner with air flow and rotation of the rotor assembly in a clockwise direction is, as noted above, within the scope of the present invention.

It is further understood that the invention is not confined to the particular construction and arrangement of parts herein illustrated and described, but embraces such modified forms thereof as come within the scope of the following claims.

What is claimed is:

1. An air precleaner that separates particulates from air, comprising:
    (a) a base assembly having an inlet port through which air enters the precleaner and an outlet port through which air exits the precleaner;
    (b) a hood that defines an air space above the base assembly so that the air space and the inlet and outlet ports are in fluid communication, a gap formed between the base assembly and the hood to serve as a discharge port for particulate matter; and
    (c) a rotor assembly that is rotatably mounted within the air space that is defined by the hood and that rotates when air enters through the inlet port to fling particulates outward for expulsion through the gap, wherein the rotor assembly further includes:
        an axle mounted to the base assembly,
        a hub that is rotatably mounted upon the axle, and
            a plurality of arms attached to the hub in the path of air entering through the inlet port, the air causing the hub to rotate upon the axle in a direction of hub rotation and causing the arms to fling particulates outward, wherein each arm includes a first blade that is mounted to the arm in a radial plane, the first blade having a leading edge and a trailing edge, and a second blade that descends from the trailing edge of the first blade in an axial plane, the second blade having a front side and a back side, the first blade extending from the front side of the second blade in a direction corresponding to the direction of hub rotation so that the leading edge of the first blade precedes the trailing edge as the arms rotate, and the back side of the second blade being free of obstruction so that air flowing past the back side of the second blade is substantially unobstructed.

2. The air precleaner of claim 1 wherein the hood is dome-shaped.

3. The air precleaner of claim 1 wherein the base assembly comprises:

(a) an inner circumferential wall that defines the outlet port; and
(b) an outer circumferential wall that is connected to the inner circumferential wall by web supports, the inlet ports being defined between web supports and the web supports being angled to direct air upon the rotor assembly to cause the rotor assembly to rotate.

4. The air precleaner of claim 3 wherein the inner circumferential wall has a strut that extends diametrically across the outlet port upon which the rotor assembly is mounted.

5. The air precleaner of claim 1 wherein there are four arms attached to the hub, each of the arms being equally spaced.

6. The air precleaner of claim 1 wherein each arm further includes a paddle extending outwardly generally in an axial plane from an outer end of the second blade.

7. The air precleaner of claim 6 wherein each paddle is in the plane of the second blade and has a larger axial dimension than the axial dimension of the second blade from which it extends.

8. The air precleaner of claim 1 wherein each first blade is wedge shaped and tapers from its widest dimension where it joins the hub to terminate at a position meeting the second blade.

9. The air precleaner of claim 1 including a tab extending downwardly from each of the second blades at a position adjacent the hub and into the outlet port.

10. The air precleaner of claim 1 wherein the discharge port is formed as a gap between the base assembly and the hood which extends substantially about a 360° interface between the base assembly and the hood.

* * * * *